United States Patent [19]
Osterhold et al.

[11] Patent Number: 5,906,864
[45] Date of Patent: May 25, 1999

[54] AQUEOUS COATING COMPOSITION AND ITS USE TO PRODUCE FILLER COATS

[75] Inventors: Michael Osterhold, Recklinghausen; Werner Lenhard, Wuppertal; Wilfried Collong, Wermelskirchen; Willi Schlesing, Wuppertal, all of Germany

[73] Assignee: Herberts Gesellschaft mit Beschrankter Haftung, Wuppertal, Germany

[21] Appl. No.: 08/880,887

[22] Filed: Jun. 23, 1997

[30] Foreign Application Priority Data

Jun. 25, 1996 [DE] Germany .......................... 196 25 344

[51] Int. Cl.⁶ .................................................... B05D 1/36
[52] U.S. Cl. .......................... 427/410; 523/404; 528/111; 528/123; 528/124
[58] Field of Search ............................. 523/404; 528/111, 528/123, 124; 427/410

[56] References Cited

U.S. PATENT DOCUMENTS

| | | |
|---|---|---|
| 4,197,389 | 4/1980 | Becker . |
| 4,835,289 | 5/1989 | Brindöpke . |
| 4,886,845 | 12/1989 | Becker . |
| 4,892,954 | 1/1990 | Brindöpke . |
| 5,032,629 | 7/1991 | Hansen . |
| 5,677,006 | 10/1997 | Hoenel et al. .......................... 428/413 |
| 5,707,741 | 1/1998 | Hoenel . |

FOREIGN PATENT DOCUMENTS

| | | |
|---|---|---|
| 2138749 | 6/1995 | Canada . |
| 0000605 | 2/1979 | European Pat. Off. . |
| 0 387 418 | 9/1990 | European Pat. Off. . |
| 0 535 794 | 4/1993 | European Pat. Off. . |
| 3529263 | 2/1987 | Germany . |
| 3600602 | 7/1987 | Germany . |
| 3643751 | 6/1988 | Germany . |
| 4123860 | 1/1993 | Germany . |
| 43 44 510 | 6/1995 | Germany . |
| WO 84/03701 | 9/1984 | WIPO . |
| WO 96/06876 | 3/1996 | WIPO . |
| WO 97/49749 | 12/1997 | WIPO . |

*Primary Examiner*—Robert Dawson
*Assistant Examiner*—D. Aylward
*Attorney, Agent, or Firm*—Pillsbury Madison & Sutro LLP

[57] ABSTRACT

Aqueous coating composition, containing

I) one or more amine hardeners,

II) one or more water-dilutable epoxy resins,

III) one or more pigments and/or fillers and

IV) water and optionally one or more solvents and/or conventional lacquer additives, wherein the composition of the coating composition is selected in such a way that a hardened free film formed from the coating composition with a coat thickness between 30 and 80 μm has a storage modulus E' of $10^8$ Pa to $5 \times 10^9$ Pa in a temperature range from −50° C. to 150° C.

11 Claims, 1 Drawing Sheet

AQUEOUS COATING COMPOSITION AND ITS USE TO PRODUCE FILLER COATS

FIELD OF THE INVENTION

The invention relates to coating compositions based on aqueous epoxy/amine systems which exhibit very good sandability. The invention also relates to the use of the coating compositions as fillers in multi-coat lacquering, particularly in the field of vehicle and vehicle component lacquering.

BACKGROUND OF THE INVENTION

Aqueous systems for coating objects are gaining in importance because environmental protection conditions are becoming increasingly stringent. Their properties must be comparable with conventional systems, i.e. ones which contain solvents. Of the cold-curing coating compositions, water-dilutable epoxy resin systems have increasingly gained in importance. These two-component (2C) systems have excellent properties, such as good drying and rapid complete curing, very good adhesion to most substrates, very good inter-layer adhesion, good corrosion protection of metals.

Various aqueous epoxy/amine systems based on different binders have already been described. DE-A-36 43 751 for example describes specific epoxy compounds based on aromatic polyols. EP-A-000 605, EP-A-387 418 and DE-A-43 44 510 describe various amine hardeners for aqueous epoxy systems, based on aminourethanes or on specific epoxy/amine adducts for example. DE-A 41 23 860 quotes conventional aqueous epoxy/amine systems which additionally contain a non-ionic polyurethane resin.

The disadvantage of the known aqueous epoxy/amine systems is that coating compositions produced from them exhibit unsatisfactory sandability, particularly in the dry state. On the one hand the coatings obtained are so hard that when sanding, it is very time-consuming to achieve sufficient material removal and/or sanding is not possible at all. On the other hand there are aqueous epoxy/amine systems which soften quickly when being sanded because of their marked thermoplasticity and soon block up the sandpaper.

SUMMARY OF THE INVENTION

The object of the invention was therefore to provide aqueous filler coating compositions which produce coatings with trouble-free surfaces and which can be satisfactorily sanded in the wet and particularly also in the dry state, without having to accept quality losses as regards these systems' known good properties.

It has been shown that this object is achieved by coating compositions on the basis of aqueous epoxy/amine systems, wherein the finished coating compositions are formulated in such a way that they meet certain storage modulus/ temperature criteria as regards the viscoelastic properties.

The invention therefore provides aqueous coating compositions containing

I) one or more amine hardeners,

II) one or more water-dilutable epoxy resins,

III) one or more pigments and/or fillers and

IV) water and optionally one or more organic solvents and/or conventional lacquer additives, wherein the composition of the coating composition is selected in such a way that a hardened free film formed from the coating composition with a coat thickness between 30 and 80 $\mu$m has a storage modulus E' of $10^8$ Pa to $5 \times 10^9$ Pa, preferably $10^8$ to $4 \times 10^9$ Pa, in a temperature range from $-50°$ C. to $150°$ C.

DETAILED DESCRIPTION OF THE INVENTION

Figure 1:
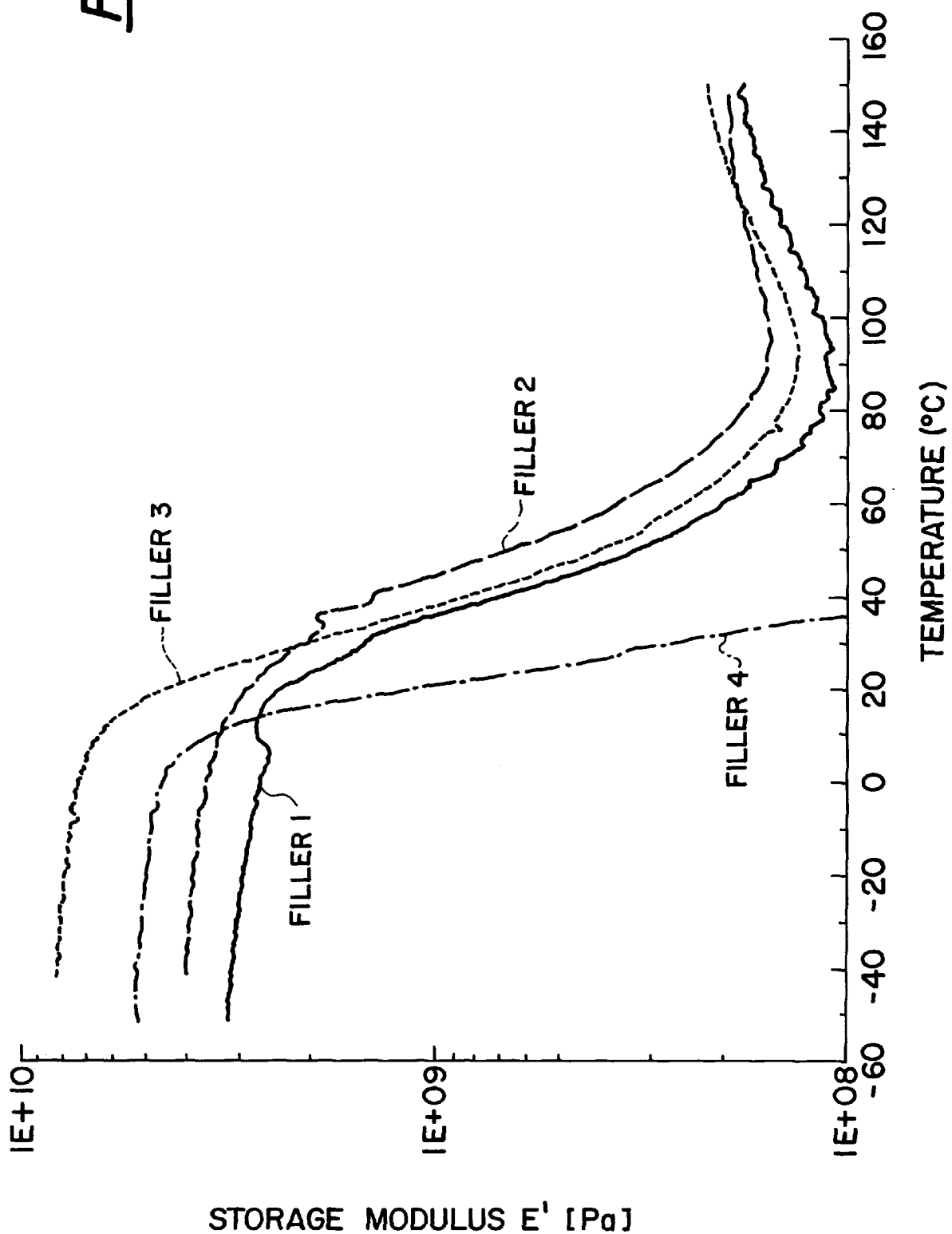
FIG. 1 shows, graphically, the storage modulus with respect to temperature for dried free film samples.

Surprisingly it has been found that aqueous filler coating compositions based on epoxy/amine systems, which as finished coating compositions exhibit the quoted temperature/storage modulus behaviour, have outstanding sandability in the wet and particularly the dry state. When being sanded, coatings obtained from these coating compositions exhibit a sufficient amount of material removal and do not block up the sanding medium, e.g. the sandpaper.

The so-called storage modulus E' is a viscoelastic parameter familiar to the person skilled in the art and described in the literature, which directly describes the elasticity of a film. A high E' means high rigidity. The storage modulus E' can be determined by means of dynamic thermomechanical analysis. The reaction of the material to a force which changes periodically is measured. Mechanical properties of a polymer film and/or a polymer coating are measured under dynamic load as a function of temperature. Various methods can be used for practical measurement, as described in the literature. The procedure can, for example, be for a small die (diameter approx. 1 mm) to press on the sample with a periodic force such as 0.1 N. The deformation of the sample is measured, by means of an inductive displacement sensor for example. The deformation of the sample is only a few percent, preferably less than 1%. The entire system can be controlled by a computer, which also undertakes the evaluation of the measurement. With the aid of a tempering device a temperature range from $-70°$ C. to $+300°$ C. for example can be evaluated. The storage moduli are conventionally determined at a frequency of 1 Hz. In addition to this so-called penetration method, dynamic tensile measurement on free films, for example, is also suitable for determining E' for lacquer films in particular. The measurements can be taken, for example, with a conventional commercial dynamic thermomechanical analyzer, as made by Perkin Elmer for example. To make the dynamic tensile measurement, free lacquer films are formed from the coating composition under test. For example, the coating compositions are spray-applied to a surface from which they can easily be detached, such as polypropylene blends. The dry coat thickness of the films formed is 30 to 80 $\mu$m, preferably 60 to 70 $\mu$m. The coatings are cured under the conditions suitable for the coating composition in question, at temperatures from 15 to 110° C., preferably 40 to 80° C., for example, for 15 minutes to 20 hours, preferably 30 to 80 minutes. The film formed is then detached from the substrate and brought to the dimensions desired for the measurement, by means of a punching die, for example, to dimensions of 4 mm wide and 15 mm long for example. In the tensile test the sample is then loaded with a periodic force and the resulting deformation is measured over the desired temperature range of $-70$ to $+300°$ C. for example. The measurements are preferably taken at a loading frequency of 1 Hz and a heating rate of 10° C./minute. Under the effect of the sinusoidal force the deformation amplitude of the free films under test is displaced with respect to the force amplitude by a phase angle $\delta$. The storage modulus E' can be calculated from this functional relationship between force and deformation according to the following equation:

$$E' = (\sigma_o/\epsilon_o)\cos\delta \quad \epsilon_o = \text{maximum value of deformation}$$
$$\sigma = F/A \quad \epsilon = \Delta l/l$$
$$F = \text{force} \quad l = \text{sample length}$$

A=cross-sectional surface area of sample
$\sigma_o$=maximum value of mechanical stress
$\Delta l$=change in length on elongation To carry out the dynamic thermomechanical analysis by tensile measurement, reference is also made to farbe+lack, vol. 99 11/1993, p. 918 ff. ("dynamische thermomechanische Analyse an freien Lackfilmen") and the further references therein, to which reference is made here. In the context of the invention the measurement can be made according to the above methods. The coating compositions according to the invention are based on amine hardeners (I) and water-dilutable epoxy resins (II) and are particularly suited to the manufacture of filler coats in multi-coat lacquering.

Conventional amines, preferably polyamines, epoxy/amine adducts, mannich bases, polyamidoamines and preferably epoxy/aminourethane adducts may be used, for example, as amine hardeners in the aqueous coating compositions according to the invention, either alone or as blends.

Examples of polyamines are aliphatic alkylene and polyalkylene amines, such as diethylene triamine, triethylene tetramine, tetraethylene pentamine, pentaethylene hexamine, propylene diamine, dipropylene triamine, also 2,2,4- and/or 2,4,4-trimethyl hexamethylene diamine, bis-(3-aminopropyl)-amine, 1,4-bis-(3'-aminopropyl)-piperazine, N,N-bis(3-aminopropyl)ethylene diamine, neopentane diamine, 2-methyl-1,5-pentane diamine, 1,3-diaminopentane, hexamethylene diamine, as well as cycloaliphatic amines such as 1,2- and/or 1,3-diaminocyclohexane, 1,4-diamino-3,6-diethyl cyclohexane, 1,2-diamino-4-ethyl cyclohexane, 1,4-diamino-3,6-diethyl cyclohexane, 1-cyclohexyl-3,4-diaminocyclohexane, isophoron diamine and reaction products thereof, 4,4'-diaminodicyclohexylmethane and -propane, 2,2-bis-(4-aminocyclohexyl)-methane and -propane, 3,3'-dimethyl-4,4'-diaminodicyclohexylmethane, 3-amino-1-cyclohexylaminopropane, 1,3- and 1,4-bis-(aminomethyl)-cyclohexane.

Further examples are araliphatic amines; those in which aliphatic amino groups are present, such as meta- and paraxylylene diamine, may be used in particular.

Apart from the above-mentioned systems, water-soluble polyalkylene polyether di- and polyamines may also be used as amine hardeners for example. Polyalkylene polyether amines preferably have a weight average molar mass (Mw) of 200 to 20000 g/mol. Ethyl, propyl and butyl units may be the basis of the polyalkylene polyether units for example. These may, for example, be reaction products of ethylene oxide, propylene oxide, butylene oxide and/or amylene oxide with monohydric and/or polyhydric alcohols, or polyethers based on tetrahydrofuran.

Examples of amine-epoxy adducts which come into consideration are reaction products of polyamines, such as aliphatic and/or cycloaliphatic and/or araliphatic polyamines such as ethylene diamine, propylene diamine, hexamethylene diamine, 2,2,4- and 2,4,4-trimethyl hexamethylene diamine, meta-xylylene diamine and/or bis(aminomethyl)-cyclohexane with terminal mono or polyepoxides, such as propylene oxide, hexene oxide, cyclohexene oxide, or with glycidyl ethers such as phenyl glycidyl ether, tert.-butyl glycidyl ether, ethylhexyl glycidyl ether, butyl glycidyl ether or with glycidyl esters, such as the glycidyl ester of versatic acid or with polyglycidyl ethers and esters.

Suitable mannich bases may for example be produced by condensation of polyamines, preferably diethylene triamine, triethylene tetramine, isophoron diamine, 2,2,4- and/or 2,4,4-trimethyl hexamethylene diamine, 1,3- and 1,4-bis (aminomethyl)-cyclohexane, particularly meta- and paraxylylene diamine with aldehydes, preferably formaldehyde, and mono or polyvalent phenols with at least one nucleus position reactive with respect to aldehydes, such as the various cresols and xylenols, para-tert.-butyl phenol, resorcinol, 4,4'-dihydroxydiphenyl methane, 2,2-bis(4'-hydroxyphenyl)-propane, preferably, however, phenol.

Polyamidoamines which may also be used as hardeners are obtained for example by reaction of polyamines with mono or polycarboxylic acids, such as dimerized fatty acids.

Amine hardeners which may preferably be used in the coating compositions according to the invention are those based on epoxy/aminourethane adducts. The epoxy/aminourethane adducts are obtainable by reaction of A) one or more aminourethanes, which are obtainable by reaction of
   a) compounds with at least one 2-oxo-1,3-dioxolan group and/or 2-oxo-1,3-dioxan group, denoted below as cyclic carbonate group, with
   b) one or more amines with at least one primary amino group, wherein the ratio between the number of cyclic carbonate groups and the number of primary amino groups is 1:10 to 1:1.1, with B) one or more water-dilutable epoxy compounds, which are obtainable by reaction of
   c) one or more polyalkylene polyethers with one primary and/or secondary α-positioned amino group and one ω-positioned alkyl or arylether group and/or one or more polyalkylene polyethers with two primary and/or secondary α,ω-positioned amino groups, with a weight average molar mass (Mw) of 200 to 20000 g/mol in each case with d) one or more epoxy compounds with at least two epoxy groups per molecule and an epoxy equivalent weight of 100 to 2000, wherein the ratio between the number of primary and/or secondary amino groups of component c) and the epoxy groups of component d) is 1:2 to 1:20, preferably 1:4 to 1:8, and the epoxy equivalent weight of the condensation products obtained from c) and d) is between 150 and 8000 and

C) optionally one or more amines different from A) with at least one primary amino group.

The compounds containing cyclic carbonate groups used in component A)a) are particularly those which contain one, preferably two or more 2-oxo-1,3-dioxolan or 2-oxo-1,3-dioxan groups, wherein these are preferably terminal. Component A)b) is amines which contain at least primary, preferably several primary and optionally also secondary and tertiary amino groups. The polyalkylene polyethers of component B)c) are preferably those with alpha-positioned secondary or primary amino group and omega-positioned alkylether or arylether group; the polyalkylene polyethers with at least two primary and/or secondary amino groups are preferably those with alpha,omega-positioned primary and/ or secondary amino groups. When component B) is manufactured the ratio between the number of primary and secondary amino groups of component c) and the number of epoxy groups of component d) is 1:2 to 1:20, preferably 1:4 to 1:8, the epoxy equivalent weight (molar mass divided by the number of epoxy groups present) of component B) is 150 to 8000, preferably 250 to 1000.

Compounds (A) may be added alone or preferably, however, in combination with conventional polyamines (C) to hydrophilic epoxy resins (B) and used in this form as amine component for the aqueous epoxy resin systems.

To manufacture the aminourethanes (A), as component (a) any cyclic carbonates can be used which can be produced by reaction of carbon dioxide with epoxy compounds according to known methods (see for example WO-A-84/03701, DE-A-35 29 263 and DE-A-36 00 602). Preferably these epoxy compounds are polyglycidyl ethers based on polyhydric, preferably dihydric alcohols, phenols, hydration products of these phenols and/or on novolak resins (reaction products of mono or polyvalent phenols with aldehydes, particularly formaldehyde in the presence of acid catalysts). The epoxy equivalent weights of these epoxy compounds are preferably between 100 and 2000, particularly between 100 and 350. The epoxy equivalent weight is the molar mass divided by the number of epoxy groups.

A detailed list of suitable epoxy compounds will be found in the handbook *"Epoxidverbindungen und Epoxidharzez"* by A M Paquin, Springer-Verlag publishers, Berlin 1958, Chapter IV and in Lee, Neville, *"Handbook of Epoxy Resins"*, McGrawHill Book Co., 1967, Chapter 2. The epoxy compounds quoted may be used individually or in a mixture.

The conventional cyclic carbonates which are obtained by reaction of carbonic esters such as dimethyl carbonate, diethyl carbonate, diphenyl carbonate, ethylene carbonate or propylene carbonate with polyols, may be used as component (a), wherein the polyols have at least four hydroxyl groups, two of each of which react with carbonic esters in a transesterification to cyclic five-ring or six-ring carbonates. Examples of polyhydric polyols are: diglycerol, triglycerol, polyglycerol, sugar alcohols (such as xylitol, mannitol, erythritol), di- and trimethylol propane, di- and trimethylol ethane, pentaerythritol, dipentaerythritol. Diglycerol is particularly preferred.

The cyclic carbonates are manufactured from the polyols in a manner familiar to the person skilled in the art, particularly by reaction of the polyols with the carbonates in the stoichiometric ratio 1.0:1.0 to 1.0:10.0 (ratio of 1,2- or 1,3-glycol groups to carbonate groups), particularly under catalysis. Examples of catalysts are basic catalysts such as: carbonates, bicarbonates, alcoholates, carboxylates, hydroxides or oxides of the alkali and alkaline earth metals, as well as Lewis-acidic substances, such as organic compounds of di- or tetravalent tin or titanium, such as tin(II)octoate, tin(II)laurate, dibutyltin oxide or titanium tetrabutylate. The catalysts may be added in a quantity of 0.01 to 1.0 wt. % related to polyol and carbonic ester for example.

When manufacturing the aminourethanes (A), amines, preferably polyamines, which contain primary amino groups capable of reaction with the carbonate groups of (a), may be used as amine component (b). These may, for example, be polyamines, amine/epoxy adducts and/or modified derivatives thereof. Examples of compounds which can be used as polyamines and/or epoxy/amine adducts are those compounds which have already been described above for components (I).

The amines quoted may be used either alone or as mixtures. They are preferably selected in such a way that they contain at least one, preferably however more than one free primary amino group.

Components (a) and (b) generally react in the required stoichiometric ratios according to conventional methods at elevated temperatures, optionally with the use of inert solvents. Reaction in the presence of solvents which are inert with respect to the cyclocarbonate group is a preferred variant of the process. The amine value (titration with perchloric acid) and the cyclocarbonate equivalence value (titration with potassium hydroxide solution) are the basis for the stoichiometric evaluation of the starting products and of the end products, and to monitor the reaction. In the reaction of components (a) and (b) the amine compounds may be introduced to the reaction individually or as mixtures, simultaneously or one after the other in terms of time, optionally dissolved in inert solvents.

For the reaction, the reaction and process conditions are selected to be moderate so that the cyclocarbonate groups of component (a) react only with the primary amino groups of component (b), without corresponding reactions with the possibly present secondary amino groups, which are considerably less reactive, also taking place. This can be achieved with conventional methods familiar to the person skilled in the art. The reaction temperatures are also kept as low as possible in order also to prevent urethane structures splitting from polyalkylene polyamines to cyclic urea derivatives.

Examples of inert solvents which come into consideration are aromatic hydrocarbons such as xylene and toluene, alcohols such as methanol, ethanol, butanols, pentanols, 1,2-propanediol, ethylene glycol and glycol ethers such as methoxy ethanol, ethoxy ethanol, methoxy propanol, butoxy ethanol, methoxy butanol, glycol dimethylether and diglycol dimethylether etc. Solvents which can easily be distilled off after the reaction has taken place or which subsequently cause no disturbance in the aqueous formulation should preferably be selected. In the latter case the solvents should only be used in a quantity that is sufficient to reduce the viscosity to a manageable extent. Esters and ketones are suitable to only a limited extent because of their potential reactivity with respect to the components.

In the reaction of components (a) and (b) the reaction temperature is in the range from 50° C. to 150° C., restricted downwards by solubility and viscosity, upwards by tendency towards secondary and side reactions as well as solvent boiling point. The preferred range is between 80° C. and 130° C. Catalysts are not required for this reaction. Carbonates and primary amines already react steadily at room temperature; in the systems described, however, higher temperatures are required as the products often exhibit high viscosity, including in solvents.

The selected quantity ratios (a):(b) are selected in such a way that amino-functional reaction products (A) are formed which are capable of reaction with the glycidyl groups of the epoxy resins (B) via these functions. At least one primary, preferably several primary amino groups in the molecule should preferably be present in the reaction product. By varying the quantity ratios, products of oligomer up to polymer character can be obtained, wherein oligomers are particularly preferred. Quantity ratios between cyclic carbonate (a) and polyamine (b) are therefore preferably selected in such a way that the ratio between the number of cyclic carbonate groups and the number of primary amine groups is 1.0:5.0 to 1.0:1.5 for the formation of oligomers.

Components c) suitable for producing the water-dilutable epoxy compounds (B) are polyalkylene polyethers with terminal secondary or primary amino group and terminal alkyl- or arylether group and/or polyalkylene polyether amines with terminal secondary or primary amino groups. The polyalkylene polyether amines preferably have a weight average molar mass (Mw) of 200 to 20000 g/mol. Ethyl, propyl or butyl units may be the basis of the polyalkylene polyether units for example. These may, for example, be reaction products of ethylene oxide, propylene oxide, butylene oxide and/or amylene oxide with monohydric and/or polyhydric alcohols, or polyethers based on tetrahydrofuran. Polyalkylene polyether amines based on ethylene oxide or propylene oxide are preferred. Polyalkylene polyether monoamines are particularly preferred.

Examples of the products which can be used as component c) are those marketed under the trade name Jeffamine by Huntsman Corporation Belgium N.V.

Examples of polyepoxy compounds d) suitable for producing the water-dilutable epoxy compounds (B) are those described above for manufacturing the cyclic carbonates (a). Examples of the large number of polyfunctional epoxy compounds which may be used are: the epoxides of polyunsaturated hydrocarbons (e.g. vinyl cyclohexane, dicyclopentadiene, cyclohexadiene, butadiene), epoxy ethers of polyhydric alcohols (e.g. ethylene, propylene, butylene glycols, glycerol, pentaerythritol, sorbitol, polyvinyl alcohol), epoxy ethers of polyvalent phenols (e.g. resorcinol, hydroquinone, bis-(4-hydroxyphenyl)-methane, bis-(4-hydroxy-3-methylphenyl)-methane, bis-(4-hydroxy-3,5-dibromophenyl)-methane, 1,1-bis-(4-hydroxyphenyl)-ethane, 2,2-bis-(4-hydroxy-3-methylphenyl)-propane, 2,2-bis-(4-hydroxy-3-chlorophenyl)-propane, 2,2-bis-(4-hydroxy-3,5-dichlorophenyl)-propane, 1,1-bis-(4-hydroxyphenyl)-cyclohexane, bis-(4-hydroxyphenyl)-cyclohexylmethane), as well as epoxides which have been produced according to conventional methods from polyunsaturated carboxylic acids or mono-unsaturated carboxylic esters of unsaturated alcohols.

Epoxy compounds which are preferably used are polyphenol-glycidyl ethers, such as the reaction products from epichlorohydrin and bisphenol A or bisphenol F. Such epoxy resins have an epoxy equivalent of 160 to 500. Mixtures of corresponding epoxy compounds may also be used.

Amine compounds, preferably polyamines, which contain at least one primary and optionally also secondary or tertiary amino groups may be used as component (C). All amines as quoted above for component b) are suitable for example.

The aminourethanes (A) are reacted with the water-dilutable epoxy resins (B) either alone or optionally in admixture with further amines (C); wherein the ratio between the number of primary amino groups of component (A) and the number of primary amino groups of component (C) is preferably 20:1 to 1:20 and the ratio between the number of all amine hydrogen atoms from (A) and (C) and the number of epoxy groups in (B) is preferably 2:1 to 20:1, particularly preferably 2:1 to 5:1.

The epoxy/aminourethane adducts which can be used according to the invention may be produced by conventional methods. The following variants are particularly preferred:

1. A polyol is presented and reacted with carbonic diester to produce cyclocarbonate (a). The further reaction now takes place with an initial quantity of an amine compound (b), which is optionally used in excess, in the manner described to produce the aminourethane (A) wherein optionally suitable inert solvents are present. A second quantity of component b), which may have the same or a different composition, is now optionally added. The product, which comprises exclusively aminourethane (A) or optionally a mixture of (A) and excess amines, is now reacted with the hydrophilic epoxy resin (B). It must be guaranteed that sufficient free amino groups remain which are used for hardening.

2. Isolated aminourethanes (A) are homogenized with amines according to (b) and optionally suitable inert solvents and reacted with a shortfall of hydrophilic epoxy resin (B) in such a way that enough free amino groups remain left over for hardening.

3. The hydrophilic epoxy resin (B) is reacted with an excess of polyamines (b) and the epoxy/amine adduct mixed with unreacted amines is reacted with carbonate compounds according to (a) as described in such a way that sufficient free amino groups remain for hardening.

If required the epoxy/aminourethane adducts obtained according to the various processes may be mixed with water-dilutable solvents.

The epoxy/aminourethane adducts (reaction products from A), B) and optionally C)) may be used as sole hardeners or mixed with further amine hardeners.

Conventional aqueous epoxy resin systems may be used for example as epoxy resin component (II) for formulating the coating compositions according to the invention. The epoxy resins may, for example, be those epoxy compounds which were described for component d). Modified, non-ionically stabilized epoxy resins as described in DE-A-36 43 751 are preferably used. It is also possible to use conventional epoxy resins as are familiar to the person skilled in the art for aqueous two-component epoxy/amine systems. They may be conventional commercial di- or polyepoxides. They are film-forming epoxy resins which are present as aqueous dispersion or as water-dilutable resin. Examples of such polyepoxides are polyglycidyl ethers based on aliphatic or aromatic diols such as bisphenol A, bisphenol F or polyalkylene glycol.

By the selection of the amine hardeners and epoxy compounds in question the properties of the finished coating compositions can be controlled in such a way that they exhibit the above-mentioned storage modulus/temperature behaviour.

The coating compositions according to the invention may contain conventional pigments and fillers, such as titanium oxide, barium sulphate, aluminium silicate, silicon dioxide, zinc phosphate, carbon black, colour-imparting and/or transparent organic or inorganic pigments, as well as conventional additives conventional in lacquers. Examples of the latter are anti-cratering agents, foam inhibitors, flow agents, catalysts, adhesion promoters. Organic solvents, preferably water-miscible solvents, may also be present in the coating composition. Their content should preferably be below 10 wt. %. The pigments, fillers and additives are added in conventional quantities familiar to the person skilled in the art.

The pigments and/or fillers may be dispersed either in the epoxy resin component or in the amine component. Dispersion in the amine component is preferred.

The coating compositions according to the invention are two-component coating compositions, i.e. the epoxy and the amine component are stored separately from each other and only mixed together shortly before application. The equivalent ratio between amino groups and epoxy groups is 5:1 to 1:5, preferably 1.5:1 to 1:1.5.

The coating compositions according to the invention are particularly suitable for manufacturing filler and/or primer coats of an air-drying or forced-drying multi-coat coating. They may, however, also be hardened at higher temperatures, of 80 to 140° C., for example. Temperatures below 80° C. are, however, preferred. They are suitable for vehicle and industrial lacquering, particularly for the touch-up lacquering of vehicles and vehicle components.

The coating compositions may be applied by known methods such as spraying, dipping, roller or knife. They may be applied to an optionally pre-treated substrate as they are or to conventional primers. They adhere well to the most aried of substrates, such as bright sheet steel, sanded, polyvinyl butyral primer, 2C-epoxy primers, sanded-down factory or old lacquer coatings. The coating compositions according to the invention may be dried at room temperature, for example, or be subjected, for example, to drying for 30 to 60 minutes for example at 60° C. after an evaporation time of 10 to 30 minutes for example.

After crosslinking, uniformly coated substrates with smooth, faultless surfaces are obtained. The coatings have no pinholes. Compared with known aqueous epoxy/polyamine systems the coating compositions according to the invention exhibit excellent sandability. After a short drying time the coatings can already be wet, and particularly also dry, sanded without difficulty. This also applies to thicker coat thicknesses. There is adequate material removal. Because of the reduced thermoplasticity no blockage of the sanding material, particularly of the sandpaper, is observed.

The coating compositions have an adequate processing time of at least 120 mins and high stability on vertical surfaces.

After drying and sanding the coating compositions according to the invention may be over-lacquered with conventional top coats without difficulty. These may be single-coat top coats, based on 2C acrylate/polyisocyanate for example, or conventional basecoat/clearcoat structures. Solvent-based or water-dilutable coating compositions may be used for over-lacquering.

The invention also relates to processes for producing multi-coat coatings and/or the use of the coating compositions to produce multi-coat coatings, wherein the filler and/or primer coats of multi-coat coatings in particular are provided by the coating compositions according to the invention.

The invention will be explained in greater detail with the aid of the examples below.

EXAMPLE 1

Production of amine hardeners based on amincurethanes 1.1 Production of cyclic carbonates (component a)

a) 1.0 gram equivalent of epoxy compound are heated to boiling in a 70%. solution of methoxypropanol with 0.2 wt. % of potassium iodide and 0.2 wt. % of triphenyl phosphane. Carbon dioxide gas is introduced into the solution at 1 bar pressure until a conversion of 97%, measured on the increase of the epoxy equivalent, is exceeded. The introduction of carbon dioxide is discontinued and the solvent distilled off in vacuo (50 mbars, 130° C.).

b) 1.0 gram equivalent of a 1,2- (or 1,3-)dihydroxy compound are heated under reflux with 1.2 mols of dimethyl carbonate and 0.5 wt. % of potassium carbonate. The boiling point drops from 90° C. (boiling point of pure dimethyl carbonate) to 64° C. (methanol). After 120 minutes' boiling at 64° C., excess dimethyl carbonate and methanol is distilled off, finally a vacuum of 50 mbars is maintained for 60 minutes at 130° C.

1.2 Production of aminourethames (component A) from carbonates a) and amines b)

The amine or the amine mixture is presented with solvent (alternatively) and heated to 70° C. The carbonate, dissolved in a solvent (alternatively) is carefully added dropwise at this temperature (see Table I ). The rate of dropwise addition depends on the exothermal reaction which is now starting and in which the temperature may not exceed 140° C. (cooling and reduction of the dropwise addition rate). After dropwise addition the temperature is maintained at 140° C. until the reaction exceeds a conversion of 90%, measured on the amine value. After cooling to 90° C., dilution to an 80% aqueous solution takes place with deionized water.

For examples see Table I.

1.3 Production of emulsifiers (component B) based on epoxy resins d) and amino-terminated polyalkylene polyethers c)

The calculated quantity of epoxy resin (for type and quantity see Table II) and amino-terminated polyalkylene ether (known by the trade name Jeffamine, from Huntsman Corporation Belgium N.V. (Belgium)) are reacted at 120° C. until the calculated epoxy equivalent is achieved.

For examples see Table II.

1.4 Production of the amine hardeners

The quantities of monomer amine or a mixture of monomer amines quoted in Table III are uniformly mixed with aminourethane at 40° C. The desired amount of epoxy-functional emulsifier is carefully added in the temperature range 60–80° C. This temperature range is maintained further after the addition. The conversion of the reaction is determined by titration of the amine values with/without tetrabutyl ammonium bromide. If there is a difference in amine values of $\leq 1$, the addition is broken off and dilution is carried out with deionized water to 80% of the as-delivered form. The epoxy hardener is thus ready for its specified use.

Tabular overview of the aqueous amine hardness

I. Table of aminourethanes

II. Table of emulsifiers

III. Table of aqueous amine hardeners

Abbreviations:

| Abbreviations for amines | |
|---|---|
| MPDA | 2-methyl-1, 5-pentane diamine (1) |
| mXDA | meta-xylylene diamine (2) |
| TMD | 2,2,4-(2,4,4)-trimethyl-1,6-hexane diamine (3) |
| TCD-DA | tricyclodecane diamine (5) |
| IPDA | isophoron diamine (3) |
| Abbreviations for epoxy resins and their carbonates | |
| EP 140 | Beckopox EP 140 (6) |
| DG | diglycerol dicarbonate |
| Abbreviations for further definitions | |
| EV | epoxy equivaient weight |
| AZ | amine value (mg KOH/g) |
| Tg | glass transition temperature |
| η | viscosity |

EXAMPLE 2

Production of fillers

Aqueous 2C-fillers (filler 1 and filler 2) are formulated from the aqueous amine hardeners quoted in Table III. To do this, 48.5 g each of aqueous hardener W 1 and W 2 and 350 g of VE water are mixed well together. 13 g of a conventional commercial polyurethane thickener and 1.3 g of a corrosion inhibitor are added to the mixture and also mixed well.

The following pigments and fillers are dispersed in these mixtures in the conventional manner:

| Filler 1: | Filler 2: |
|---|---|
| 39 g of silicon dioxide | 48 g of silicon dioxide |
| 110 g of barium sulphate | 170 g of barium sulphate |
| 117 g of aluminium silicate | 140 g of aluminium silicate |
| 128 g of titanium dioxide | 154 g of titanium dioxide |
| 6 g of yellow iron oxide | 8 g of iron oxide |

Shortly before application, the following quantities of a conventional commercial aqueous epoxy resin (53%, Beckopox EP 384 w from Hoechst AG) are added to the polyamine components thus obtained and both components are intensively mixed by stirring:

| Aqueous hardener | Quantity of epoxy resin | |
|---|---|---|
| W1 | 311 g | (Filler 1) |
| W2 | 391 g | (Filler 2) |

EXAMPLE 3
Production of reference fillers

A filler is produced according to Example 6 of DE-A-43 44 510 (Filler 3).

A filler is produced according to Example 3 of DE-A-41 23 860 (Filler 4), wherein pigment paste 1 is produced with the following pigment/filler combination whilst the contents of the other constituents remain unchanged:

450 g of silicon dioxide
1600 g of barium sulphate
1300 g of aluminium silicate
1500 g of titanium dioxide
60 g of iron oxide Procedure for the dynamic thermomechanical analyeis to determine the storacze modulus E'

The storage moduli E' of the filler coating compositions produced (fillers 1–4) are determined as a function of temperature using a Perkin Elmer DMA 7 dynamic thermomechanical analyzer.

Measurement conditions:
temperature range: −50° C. to 150° C.
heating rate 10° C./min
frequency: 1 Hz
glassy state: amplitude setting 2 µm max.
outside glassy state: force setting (static force 20–30 mN, dynamic force 15–25 mN)

For analysis, the filler coating compositions (fillers 1–4) are first applied in a coat thickness of 60 µm, dried for 60 minutes at 60° C., then detached and then measured in the tensile test as free film.

The results of the measurements are shown in the accompanying FIG. 1.

Application of coating compositions

To assess the lacquer properties, each of the filler coating compositions (fillers 1–4) is sprayed onto steel substrates pre-coated with cataphoretic primer and dried for 60 minutes at 60° C. After drying and sanding the filler coats are over-lacquered with a conventional solvent-based 2C top coat (acrylate/polyisocyanate based).

Filler coating compositions 1 and 2 each exhibit excellent flow. The surface quality is very good. No surface defects (pinholes, bubbles) are discernible, including after the top coat has been applied. The filler coats obtained (fillers 1 and 2) can be dry and wet sanded very well in coat thicknesses from 30 to 130 µm.

Material removal is used as a criterion for assessing sandability. To do this, sanding takes place for 30 s with a conventional commercial eccentric sander (with a 2 kg load, P 400 sandpaper, diameter of sanding disc 20 cm) and the amount removed is then determined gravimetrically.

A comparison between the fillers under test is shown in the Table below.

| Filler | Surface quality | Sandability Blockage of sandpaper | Material removed |
|---|---|---|---|
| 1 | very good | no | 1.0 g |
| 2 | very good | no | 1.2 g |
| 3 (reference) | good | no | 0.4 g |
| 4 (reference) | good | yes | 0.2 g |

TABLE I

Table of aminourethanes (Component A)

| Ref. | Amine 1 b) | Amine 2 b) | Carbonate a) | Method | Ratio # | Aminourethane AZ | η mPa.s/ 25° C. | Tg |
|---|---|---|---|---|---|---|---|---|
| U1 | mXDA | TMD | DG | 2 | 2:1:2 | 164 | 2900 | 0 |
| U2 | mXDA | MPDA | DG | 2 | 2:1:2 | 166 | 2100 | 0 |

The ratio quoted is the equivalent of amine 1 to the amine 2 amino group equivalents to the carbonate equivalents.

TABLE II

Table of emulsifiers (Component B)

| | d) Epoxy resin 1 | | d) Epoxy resin 2 | | c) Jeffamine | | Emulsifier parameters | |
|---|---|---|---|---|---|---|---|---|
| Ref. | Type | Weighed sample | Type | Weighed sample | Type | Weighed sample | EV | η mPa.s/ 25° C. |
| E1 | EP 140 | 603 g | 0 | 0 | M-2070 | 440 g | 355 | 7300 |
| E2 | EP 140 | 603 g | 0 | 0 | H-1000 | 440 g | 420 | 9900 |

TABLE III

Table of aqueous hardeners

| | C) Amine 1 | | C) Amine 2 | | A) Aminourethane | | B) Emulsifier | | Aqueous hardener | |
|---|---|---|---|---|---|---|---|---|---|---|
| Ref. | Type | Weighed sample | Type | Weighed sample | Type | Weighed sample | Type | Weighed sample | AZ | η mPa.s/ 25° C. |
| W1 | mXDA | 1020 g | IPDA | 1190 g | U1 | 1436 g | E1 | 3550 g | 217 | 16.1 |
| W2 | mXDA | 1007 g | TCD-DA | 1358 g | U2 | 1515 g | E2 | 4200 g | 273 | 15.4 |

We claim:

1. Aqueous coating composition, comprising

I) one or more amine hardeners,

II) one or more water-dilutable epoxy resins,

III) one or more members selected from the group consisting of pigments and fillers, and IV) water, optionally one or more solvents and, optionally one or more lacquer additives selected from the group consisting of anti-cratering agents, foam inhibitors, flow agents, catalysts and adhesion promoters, wherein the composition of the coating composition is selected in such a way that a hardened free film formed from the coating composition with a coat thickness between 30 and 80 μm has a storage modulus E' of $10^8$ Pa to $5 \times 10^9$ Pa in a temperature range from −50° C. to 150° C.

2. Aqueous coating composition according to claim 1, comprising at least one amine hardener (I) selected from the group consisting of polyamines, epoxy/amine adducts, Mannich bases, polyamidoamines and epoxy/aminourethane adducts.

3. Aqueous coating composition comprising

I) one or more amine hardeners, at least one of said amine hardeners comprising an epoxy/aminourethane adduct, II) one or more water-dillutable epoxy resins, III) one or more members selected from the group consisting of pigments and fillers, and IV) water and optionally one or more solvents, wherein the at least one amine hardener based on an epoxy/aminourethane adduct is obtained by reaction of A) one or more aminourethanes, which are obtainable by reaction of (a) compounds with at least one 2-oxo-1,3-dioxoan group and/or 2-oxo-1,3-dioxan group, denoted below as cyclic carbonate group, with b) one or more amines with at least one primary amino group, wherein the ratio between the number of cyclic carbonate groups and the number of primary amino groups is 1:10 to 1:1.1, with B) one or more water-dilutable epoxy compounds, which are obtainable by reaction of c) one or more polyalkylene polyethers with one primary and/or secondary α-positioned amino group and one ω-positioned alkylether or arylether group and/or one or more polyalkylene polyethers with two primary and/or secondary α,ω-positioned amino groups, with a weight average molar mass (Mw) of 200 to 20000 g/mol in each case with d) one or more epoxy compounds with at least two epoxy groups per molecule and an epoxy equivalent weight of 100 to 2000, wherein the ratio between the number of primary and/or secondary amino groups of component c) and the epoxy groups of component d) is 1:2 to 1:20 and the epoxy equivalent weight of the condensation products obtained from c) and d) is between 150 and 8000 and C) optionally one or more amines different from A) with at least one primary amino group; and wherein the composition of the coating composition is selected in such a way that a hardened free firm formed from the coating composition with a coat thickness between 30 and 80 μm has a storage modulus E' of $10^8$ Pa to $5 \times 10^9$ Pa in a temperature range from −50° C. to 150° C.

4. Aqueous coating composition according to claim 3, wherein the amines b) and optionally the amines C) are selected independently of each other from the groups b1) primary diamines, b2) amines with three or more primary amino groups, b3) primary diamines which contain further secondary and/or tertiary amino groups, b4) amines with three or more primary amino groups which contain further secondary and/or tertiary amino groups.

5. Aqueous coating composition according to claim 3 wherein the amines b2) and optionally the amines comprise members (C) selected independently of each other from the group consisting of polyalkylene polyamines, polyoxyalkylene polyamines, polyaminoalkyl aromatics, cycloalkylene polyamines and reaction products of diamines or polyamines with compounds which have at least one terminal epoxy group.

6. Aqueous coating composition according to claim 3, wherein the compounds a) with at least one cyclic carbonate group are obtainable by reaction of glycidyl ethers of polyhydric alcohols or phenols, their hydration products or novolaks with carbon dioxide.

7. Aqueous coating composition according to claim 3, wherein the compounds a) with at least one cyclic carbonate group are obtainable by reaction of polyhydric alcohols with carbonic esters.

8. Aqueous coating compositions according to claim 3 wherein when synthesizing the aminourethanes the ratio between the number of cyclic carbonates and the number of primary amino groups is 1:5 to 1:1.5.

9. Aqueous coating composition according to claim 3, wherein the aminourethanes (A) are used in admixture with further amines (C); and in a ratio between the number of primary amino groups of (A) and the number of primary amino groups in (C) of 20:1 to 1:20.

10. Process for producing multi-coat coatings by applying a primer coat and a filler coat to a substrate to be lacquered and optionally applying one or more further coating composition coats, wherein a coat of the coating composition according to claim 1 is applied as at least one of the primer coat and the filler coat.

11. A process for using a coating composition according to claim 1 comprising: producing at least one member selected from the group consisting of primers and filler coats in multi-coat lacquer coats for vehicle and vehicle component lacquering using said coating compositions.

* * * * *